J. SCHÜTTE.
DIRIGIBLE BALLOON.
APPLICATION FILED MAY 1, 1912.
1,072,514. Patented Sept. 9, 1913.
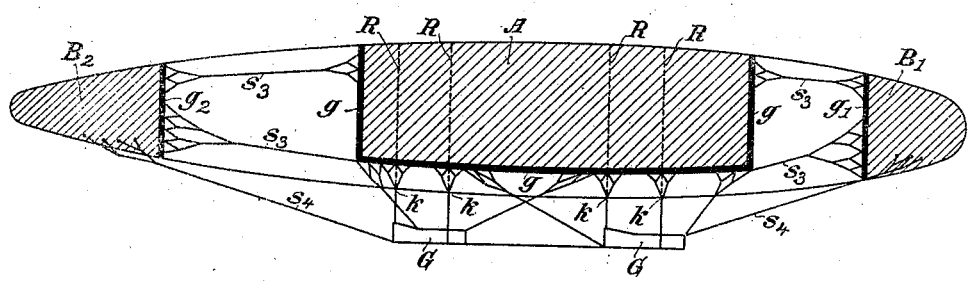
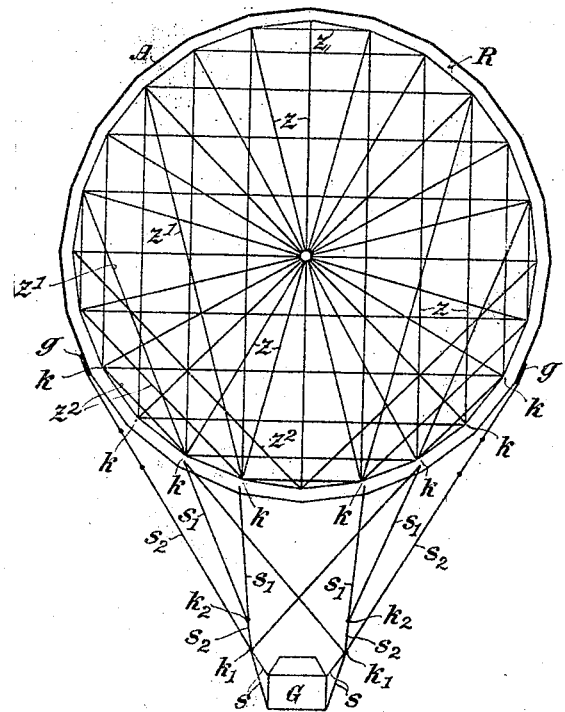
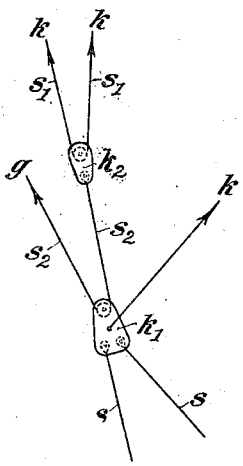

UNITED STATES PATENT OFFICE.

JOHANN SCHÜTTE, OF DANZIG, GERMANY.

DIRIGIBLE BALLOON.

1,072,514.  Specification of Letters Patent.  Patented Sept. 9, 1913.

Application filed May 1, 1912. Serial No. 694,544.

*To all whom it may concern:*

Be it known that I, JOHANN SCHÜTTE, a subject of the German Emperor, residing at No. 31 Grosse Allee, Danzig, in the German Empire, have invented certain new and useful Improvements in Dirigible Balloons; and I do hereby declare the following to be a full, clear, and exact description of the invention, such as will enable others skilled in the art to which it appertains to make and use the same.

Experience has demonstrated that in dirigible balloons or air-ships whose gas-holders are provided with a frame the rigid connection between the car and the frame which has hitherto been used is unsuitable, inasmuch as on alighting or striking trees and so forth it not only entails injury to the car and its connections with the frame but also injury to the frame itself. It has frequently happened that the entire craft has been destroyed from this cause.

The arrangement in resilient or "non-rigid" dirigible balloons, where the cars are flexibly suspended on two lateral belts of the fabric envelop by means of cords, in such a manner, however, that they are unable to shift relatively to the gas-holder body in the transverse and longitudinal directions during flight, is much more favorable.

Now the present invention has for its object to render the advantages of the "non-rigid" suspension utilizable for so-called "frame" air-ships also, while at the same time relieving the several elements of the frame from powerful local strains and to reinforce the total assemblage of the frame considerably.

The invention is illustrated by way of example in the accompanying drawing, in which:

Figure 1 shows the suspension of the car and the reinforcement of the frame in elevation. Fig. 2 shows the same in section, and Fig. 3 illustrates a detail of the suspension of the car.

The accompanying drawing illustrates a dirigible balloon, the frame of which consists of longitudinal bearers bent into corrugations the summits of which are connected to form a circular body, and also of transverse bearers located inside of the longitudinal bearers and fitted annularly at the points of connection of said longitudinal bearers.

The framework is an open cage covered with fabric and the gas envelop is arranged inside thereof.

Cables $s'$ run to the joints $k$ of the transverse bearers R of the frame. Externally, beside these cables $s'$ cables $s^2$ are provided which are secured to the lateral bands $g$ of the fabric saddle A tightly fitting over the middle portion of the frame. The tensile strain of these cables $s^2$ is distributed over large lengths of the bands $g$ and by these over the saddle A itself by dividing the cables at their ends, that is to say by what are termed "crows feet." In this manner the weights of the cars and any shocks that may arise are transmitted on the one hand to the corresponding rigid elements of the frame and on the other hand to the saddle A and thereby over the system as a whole.

As shown in Figs. 2 and 3 the suspension is effected by means of a sling or slip loop so that on lateral tilting of the cars at the moment of an unintentional and sharp shock or blow the tensile strain is not as hitherto distributed onto a single cable or a single frame element but over the entire system through the cables. By this means powerful local strains which might lead to fracture of the frame are largely prevented and the shock is always largely weakened. The special construction clearly discloses the difference between this non-rigid suspension as compared with rigid suspension, that is to say the novel method of connecting the cars with the gas holder body as compared with that in a resilient or non-rigid dirigible. The cables $s$ first proceeding from the cars G lead to the junction $k'$ of the cable construction and are here connected with the bolts of the junction plates by thimbles. Between the plates of the junction point $k'$ a roller is provided over which the cable $s^2$ runs. The external end of this slip loop cable $s^2$ extends to the band $g$ of the saddle A with which it is connected by crows feet. The inner end of the cable $s^2$ leads to a junction point $k^2$ where it is firmly tied between the junction plates to a belt by means of thimbles. The junction plates of this junction point $k^2$ also carry a roller over which the cable $s'$ runs, its ends being firmly connected with the junction points $k$ of the transverse bearer R of the frame, as stated above.

In order to prevent longitudinal shifting of the saddle A, which owing to its friction with the frame imparts a certain rigidity to the frame bearers and thereby largely increases the rigidity and security of the system, the ends of the frame are inclosed in caps B' B² of strong material, the bands $g'$ $g^2$ of which are connected with the bands $g$ of the saddle A by cables $s^3$ and crows feet, and connecting cables $s^4$ are also provided which run from these caps to the cars. These end or prow and stern caps also afford security against fracture of the frame in the case of collision with trees and other objects. As the material of which these end caps are made is very strong (presenting a strength of 1 meter extension length for 2000 kg.) generally speaking breaking branches etc. slide on the frame, which between the saddle and the dirigible ends is coated with thin impregnated fabric without injuring the fabric or becoming caught in the connections of the frame and breaking them.

For the purpose of further stiffening the frame the transverse bearers R are stretched by means of traction members (Fig. 2) which connect the junctions $k$ of the cross bearer one with the other. In the first place each junction $k$ is connected with the junction diametrically opposite to it and the junction points located on the same verticals and horizontals are connected as shown by traction members, such as wire cables for example. In this manner every three junction points $k$ are connected by an immovable triangular connection. Furthermore those junction points of the lower half of the cross bearer upon which the cars G are suspended are connected with further junction points of the upper half of the bearer by traction members $z'$. Finally for stiffening the lower part of the transverse bearers its junctions are connected one with the other by traction members $z^2$. This method of stretching the transverse bearer provides an effectual stiffening of the frame and the uniform distribution of all loads and shocks over all the parts of the assemblage. Consequently while in the case of rigid connection of the frame with the cars as hitherto effected all the intermediate parts between the cars and the frame led to separate frame elements and in non-rigid dirigibles only the lateral belts are intended for supporting the load, by means of the present invention it is possible to obtain a far more favorable distribution of the forces resulting from the load and from shocks and at the same time to strengthen the frame itself and render it a far stronger and more stable structure.

What I claim and desire to secure by Letters Patent of the United States is:—

1. A dirigible balloon comprising in combination, a gas holder, a framework, a saddle arranged thereover, and cap members arranged at each end of the framework and connected with the saddle.

2. A dirigible balloon comprising in combination, a gas holder, a framework, a saddle disposed thereover, a plurality of suspended cars, and a cap member arranged at each end of the framework and connected with the saddle and with said cars.

3. A dirigible balloon comprising in combination, a gas holder, a framework, a saddle of strong material arranged thereover, and cap members inclosing the ends of the framework and connected with the saddle, the said saddle and caps serving to hold the individual elements of the framework together, and reinforcing means for the frame elements.

4. A dirigible balloon comprising in combination, a gas holder, a frame comprising longitudinally and transversely arranged bearers, a saddle member disposed thereover, prow and stern caps inclosing the ends of the longitudinal bearers and connected by cables with the saddle, cars suspended from the saddle and the end caps, the connection and suspension of the said cars being such that the load and all shocks and tilting movements are spread over the system as a whole.

5. A dirigible balloon comprising a gas holder, a framework, a saddle arranged thereon, caps arranged at the ends of the frame and connected with the saddle, and cars suspended from the framework, the saddle and the caps, each suspension element comprising a series of cable members which are in connection one with another by means of a plurality of plates, provided with rollers over which the cable members pass.

6. A dirigible balloon comprising a gas holder, a framework, cap members arranged at each end thereof, a saddle disposed over the frame and connected with the caps, cars suspended from the frame and the saddle and the end caps, each suspension element of the cars from the frame and saddle comprising a series of cable members which are in connection one with another by means of a plurality of junction plates fitted with rollers over which the cable members pass, a central cable member being connected to one plate, passing over a pulley on another and having its end connected with a band on the saddle.

7. A dirigible balloon comprising in combination a gas holder, a framework, a saddle arranged thereover, cap members arranged at the ends of the framework, and cars suspended from the framework, the saddle and the caps, the said framework being constituted by longitudinal and transverse bearers, the latter comprising a series of junction points each point of which is in connection with three others, substantially as described.

8. A dirigible balloon comprising in combination, a gas holder, a framework system inclosing the same, cap members inclosing the ends of the framework, and cars suspended from the said framework and caps, the framework being constituted by longitudinal and substantially circular transverse bearers, the latter of which each comprising a series of junction points each of which is in connection by traction members with three points located diametrically opposite, and on the horizontal and vertical drawn therefrom to the periphery of the said bearer.

9. A dirigible balloon comprising in combination, a gas holder, a framework system inclosing the gas holder, a saddle arranged thereover, a cap member arranged at each end of the framework and connected with the saddle, and cars suspended from the framework, the saddle and the caps, the framework system comprising longitudinal and substantially circular transverse bearers the latter of which each having a series of junction points each of which is in connection with three other points, the points of the lower half of the bearer being connected with additional junction points of the upper half of the bearer.

10. A dirigible balloon comprising a gas holder, a framework system inclosing the gas holder, a saddle arranged thereover, a cap member arranged at each end of the framework and connected with the saddle, and cars resiliently suspended from the framework, the saddle and the end caps, each suspension element of the car from the frame and saddle comprising a series of cable members which are in connection one with another by means of a plurality of junction plates fitted with rollers over which the cable members pass, and the framework system comprising longitudinal and transverse bearers, each of the latter being provided with a series of junction points, each point of which is in connection with other junction points of the same transverse bearer, substantially as described.

11. A dirigible balloon comprising a gas holder, a framework system inclosing the same, a cap member arranged at each end of the framework, and cars suspended from the framework and from the end caps, the framework system comprising longitudinal and substantially circular transverse bearers each of the latter comprising a series of junction points each point of which is connected by traction members with three others and the points of the lower half of the bearer being connected with one another.

12. A dirigible balloon comprising a gas holder, a framework system inclosing the same, a cap member arranged at each end of the framework, and cars suspended from the framework and from the end caps, the framework system being constituted by longitudinal and transverse bearers, each of the latter bearers comprising a series of junction points each point of which is in connection with the three points located diametrically opposite and on the lines drawn horizontally and vertically therefrom to the periphery of the bearer, the points of the lower half of the bearer being connected with those of the upper half and also with one another.

In testimony whereof, I have affixed my signature, in presence of two witnesses.

JOHANN SCHÜTTE.

Witnesses:
 WALTER BLEISSEN,
 KARL WALTHER.